United States Patent [19]

Kennedy

[11] Patent Number: 4,924,984

[45] Date of Patent: May 15, 1990

[54] QUICK PUMP-OUT CLUTCH PLATE FOR A VISCOUS FLUID CLUTCH

[75] Inventor: Lawrence C. Kennedy, Kettering, Ohio

[73] Assignee: General Motors Corporation, Detroit, Mich.

[21] Appl. No.: 355,537

[22] Filed: May 22, 1989

[51] Int. Cl.$^5$ .............................................. F16D 33/12
[52] U.S. Cl. .................................. 192/58 B; 192/82 T
[58] Field of Search ........................... 192/82 T, 58 B; 123/41.12

[56] References Cited

U.S. PATENT DOCUMENTS

| | | | |
|---|---|---|---|
| 3,272,293 | 9/1966 | Heater | 192/58 B |
| 3,575,269 | 4/1971 | Sherman | 192/58 B |
| 3,809,197 | 5/1974 | Clancey | 192/82 T |
| 3,899,059 | 8/1975 | Leichliter | 192/58 B |
| 4,004,668 | 1/1977 | Blair | 192/58 B |
| 4,190,139 | 2/1980 | Tinholt et al. | 192/82 T |
| 4,235,322 | 11/1980 | Sutaruk | 192/58 B |
| 4,238,015 | 12/1980 | Schmida | 192/58 B |
| 4,281,750 | 8/1981 | Clancey | 192/58 B |

Primary Examiner—Rodney H. Bonck
Assistant Examiner—Nicholas Whitelaw
Attorney, Agent, or Firm—A. Michael Tucker

[57] ABSTRACT

A fan clutch assembly for a vehicle includes a clutch plate rotatably driven by an input shaft. The clutch plate includes a plurality of concentric, annular lands and grooves which are mated with complementary lands and grooves of a clutch body to form a shear zone. A plurality of passages are provided in the clutch plate lands and grooves for directing fluid from a reservoir to the shear zone. A plurality of radial channels are provided in the clutch plate lands and grooves to expel fluid from the shear zone to a receiving chamber of the clutch plate assembly. Each channel is aligned with and leads radially outwardly from a respective passage. Preferably, each groove includes an aligned notch provided on the circumference of the clutch plate. The notch includes a mouth on the surface of the clutch plate adjacent the lands and grooves and an exit on the surface of the clutch plate adjacent a receiving chamber. An angled wall provided with each notch fluid from a channel to the receiving chamber of the clutch plate assembly.

18 Claims, 3 Drawing Sheets

QUICK PUMP-OUT CLUTCH PLATE FOR A VISCOUS FLUID CLUTCH

BACKGROUND OF THE INVENTION

1. Field of the Invention

The present invention relates generally to a viscous fluid coupling device. In particular, the present invention is concerned with a quick pump-out clutch plate of a viscous fluid fan clutch for a vehicle.

2. Statement of the Related Art

A thermostatically-controlled viscous fluid clutch assembly for driving and rotating a vehicle cooling fan is well-known. A multi-bladed fan is removably secured to a body of the clutch assembly. The fan and clutch assembly are installed between an accessory pulley of a vehicle engine (typically the water pump pulley) and a radiator. The clutch assembly drives the fan at high speeds close to input speed when cooling is required and permits the fan to rotate at low speeds when cooling is not required. Thermostatic control of the fan through the clutch assembly reduces the load on an engine and the noise caused by fan rotation, resulting in horse power gain and improved fuel economy.

Generally, a clutch plate, housed within the clutch assembly, having lands and grooves is mated to the body having complementary lands and grooves. A pump plate separates a pair of internally-contained chambers, a receiving chamber and a collecting chamber, from a reservoir. Gates in the pump plate permit selective flow of a viscous fluid from the reservoir to the receiving chamber and into a shear zone between the lands and grooves of the body and clutch plate. Fluid shear in the lands and grooves transfers input torque from the clutch plate to drive the body and the attached fan.

When cooling is not required, gates in the pump plate are closed and the fluid in the shear zone is pumped into the receiving chamber. Orifices in the pump plate permit passages of the fluid from the receiving chamber into the reservoir. The removal of a majority of the fluid reduces the shear between the clutch plate and the body, thereby substantially reducing the rotation of the fan.

When an engine is not running, fluid in the reservoir may settle at an equilibrium level in a conventional clutch assembly. Fluid pressure may cause the migration of fluid from the reservoir into the receiving chamber through the pump plate orifices and into the shear zone. When an engine is next started, fluid that has migrated into the shear zone results in annoying high-speed operation of the fan. Such high-speed operation creates unwanted noise from the fan blades. Also, excessive rotation of the fan of a cold engine increases the engine warm-up period.

The art continues to seek improvements. It is desirable that a viscous fluid clutch assembly provide thermostatic operation of a fan when cooling is required. Furthermore, it is desirable that a clutch assembly quickly pump out the majority of fluid that may have migrated from a reservoir to a shear zone when a cold engine is started.

SUMMARY OF THE INVENTION

The present invention includes a viscous fluid drive device particularly adaptable for a fan clutch assembly of a vehicle. The present fan clutch assembly includes a clutch plate which quickly pumps out the majority of fluid that may have migrated from a reservoir to a receiving chamber when an engine was not running. Quick pump-out of such fluid reduces the high-speed operation of a fan and its accompanying noise when a cold engine is started.

The present invention includes a fan clutch assembly for a vehicle. A clutch assembly includes a clutch plate rotatably driven by an input shaft. The clutch plate includes a plurality of concentric, annular lands and grooves which are mated with complementary lands and grooves of a clutch body to form a shear zone. A plurality of passages are provided in the clutch plate lands and grooves for directing fluid from a reservoir to the shear zone. A plurality of radial channels are provided in the clutch plate lands and grooves to expel fluid from the shear zone to a receiving chamber of the clutch plate assembly. Each channel is aligned with and leads radially outwardly from a respective passage.

Preferably, each channel includes an aligned notch provided on the circumference of the clutch plate. Each notch includes a mouth on the surface of the clutch plate adjacent the lands and grooves and an exit on the surface of the clutch plate adjacent the receiving chamber. An angled wall provided with each notch pumps fluid from a channel to the receiving chamber of the clutch plate assembly.

DETAILED DESCRIPTION OF THE PREFERRED EMBODIMENT

Figure 1:
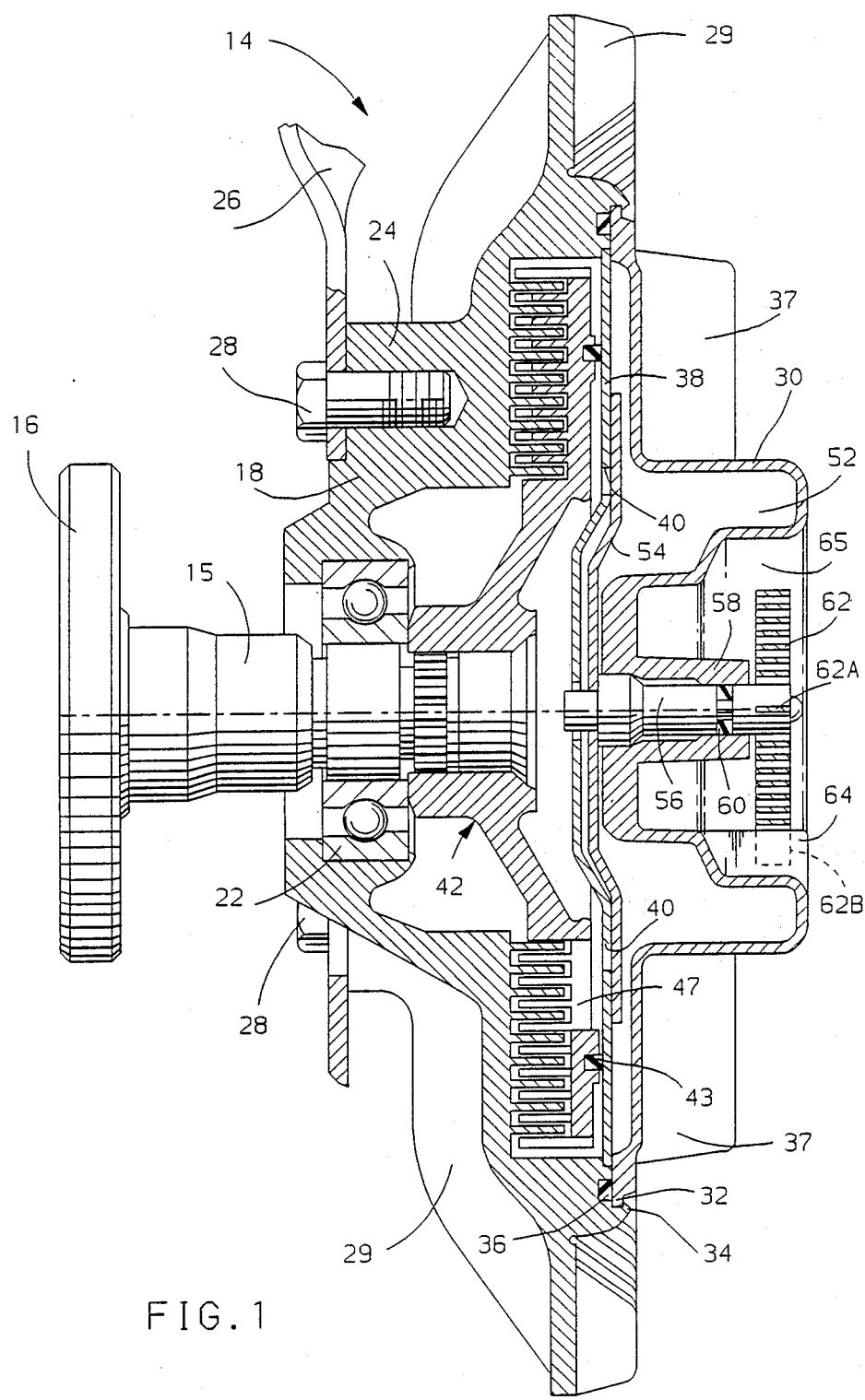
FIG. 1 is a sectional view of a viscous fluid fan clutch and blade assembly incorporating a clutch plate of the present invention.

FIG. 1 illustrates a multi-bladed fan and clutch assembly, indicated generally at 14, for drawing cooling air through the core of a vehicle radiator (not illustrated) through which engine cooling fluid is circulated. The fan and clutch assembly 14 is mounted on the outboard end of a rotatably driven shaft 15 whose inboard end terminates in a flange 16 which can be secured to a conventional engine-driven water pump pulley (not illustrated). The fan and clutch assembly 14 includes a dished main body 18 centrally mounted for rotation on shaft 15 by a bearing 22. The main body 18 is formed with a plurality of radially extending bosses 24 to which a multi-bladed fan 26 (partially illustrated in FIG. 1) is attached by threaded fasteners 28. A plurality of fins 29 is provided on the outer surface of the main body 18 to dissipate heat transferred from a viscous fluid housed by the assembly 14.

A cover plate 30 is mounted to a front face of and cooperates with the main body 18 to form a housing and reservoir as described below. The cover plate 30 is a dished member whose annular outer edge 32 is secured to the main body 18 by an annular retainer lip 34 spun over from the material of the main body 18. An annular seal 36, e.g., a formed-in-place gasket, is interposed between the edge 32 and the front face of the main body 18 to prevent leakage of the fluid from the interior of the assembly 14. A plurality of fins 37 is provided on the outer surface of the cover plate 30 to dissipate heat transferred from the fluid.

Disposed behind the cover plate 30 is a disk-like annular pump plate 38 whose diameter is slightly less than that of the cover plate 30. The pump plate 38 is drivingly secured to the main body 18 as it is trapped on an annular shoulder 39 (FIG. 2) on the main body 18 by the cover plate 30.

The pump plate 38 has a pair of diametrically opposed passages or gates 40 provided in its central portion. When opened, gates 40 allow the fluid to flow into a collecting chamber 41 (illustrated best in FIG. 2) formed and bounded by the pump plate 38, a clutch plate 42 and a divider ring 43. The clutch plate 42 is splined on shaft 15 at a central opening and provides for the hydraulic drive of the main body 18 and attached fan 26 as described below. Ring 43, preferably formed from TEFLON, is mounted in an annular groove 43A in the outer or front face of the clutch plate 42 and improves pump-out or clutch disengagement as described below. A divider ring of this type is described in U.S. Pat. No. 4,741,421, issued May 3, 1988, assigned to the assignee of this invention and hereby incorporated by reference.

Figure 2:
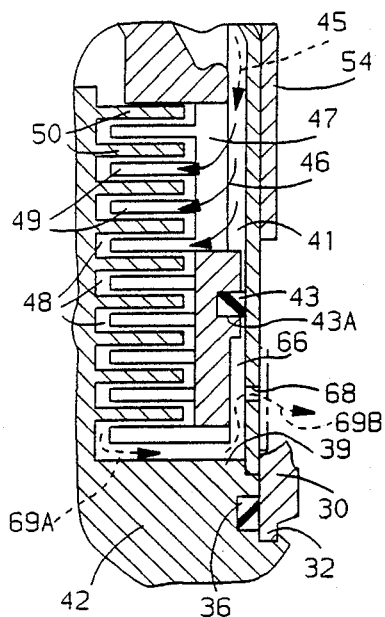
FIG. 2 is an enlarged view of a portion of the clutch assembly of FIG. 1 wherein the pump plate has been rotated to illustrate axial fluid flow from a receiving chamber through the pump plate.
Figure 4:
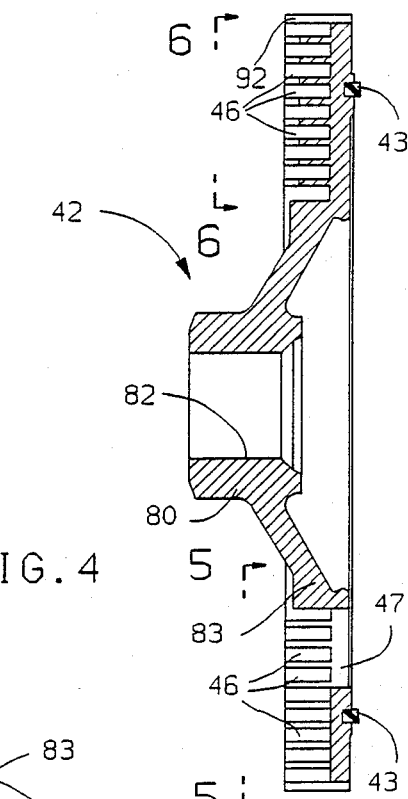
FIG. 4 is a sectional view taken along line 4—4 of FIG. 3.
Figure 3:
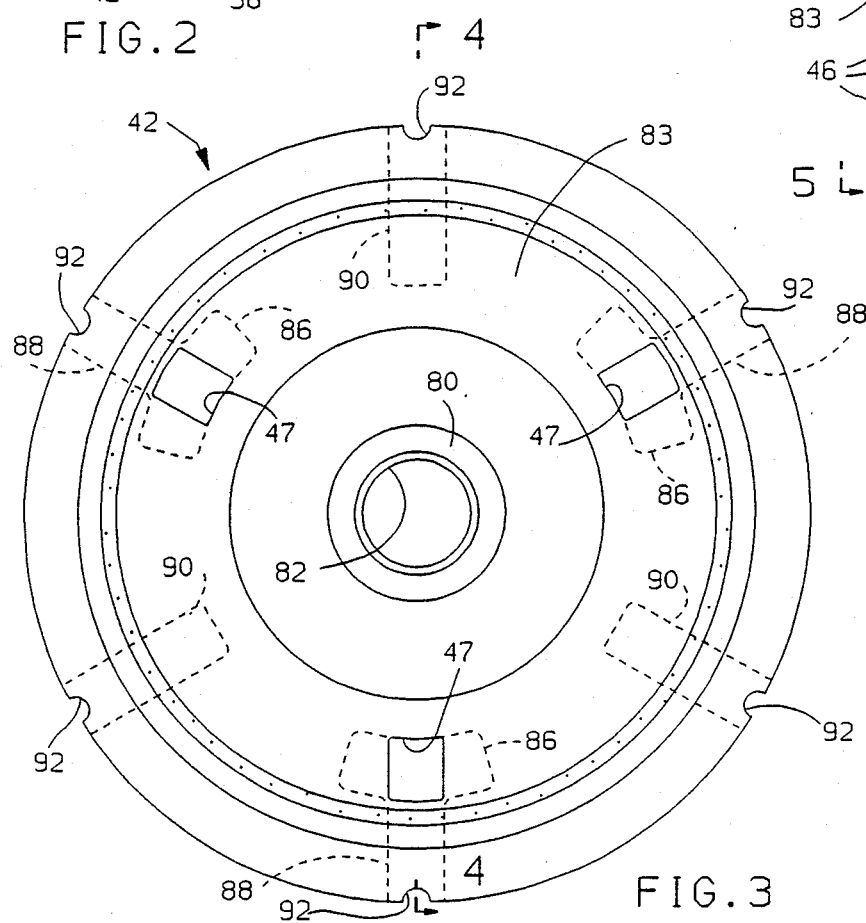
FIG. 3 is a top plan view of the front face of the present clutch plate removed from the clutch assembly of FIG. 1 for purposes of clarity of illustration.
Figure 5:
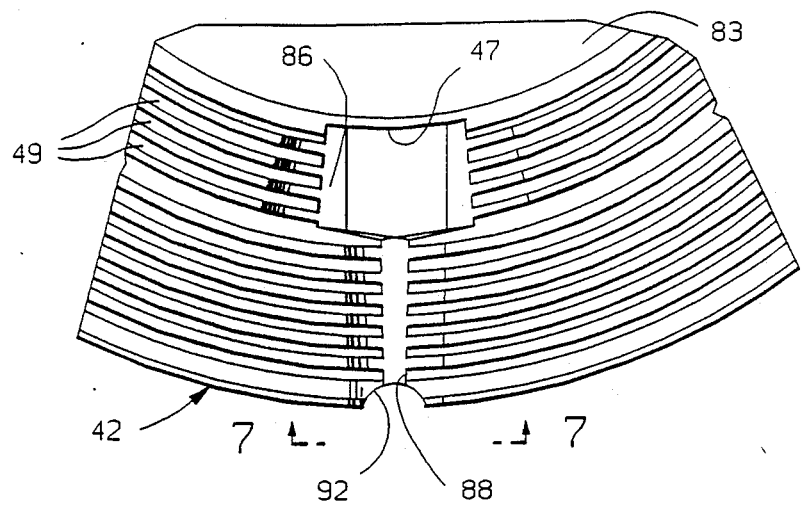
FIG. 5 is an enlarged top plan view of a portion of the rear face of the present clutch plate as seen along line 5—5 of FIG. 4 illustrating a fluid passage and an expulsion channel.
Figure 6:
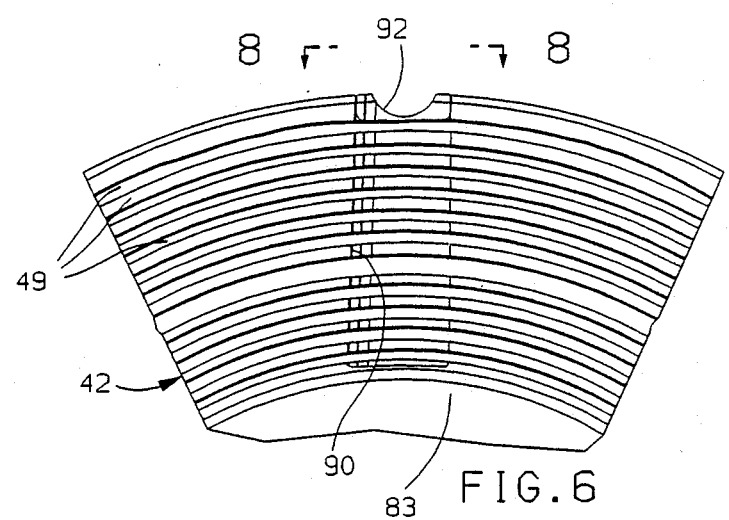
FIG. 6 is an enlarged top plan view of a portion the rear face of the present clutch plate as seen along line 6—6 of FIG. 4 illustrating a dispersion channel.

As illustrated in FIG. 2, the centrifugal forces of the rotating assembly 14 force the axial fluid flow through gate 40 to radial fluid flow as indicated by directional arrows 45 into the collecting chamber 41.

Axial flow fluid, as indicated by directional arrows 46, is forced through well-known passages 47 in the clutch plate 42 into an annular serpentine fluid shear zone 48 formed by the grooves or spaces between interleaved concentric annular ridges or lands 49 formed in a rear face of a clutch plate 42 and complementary concentric annular ridges or lands 50 formed on an interior surface of the main body 18.

Fluid sheared in the shear zone 48 transmits input torque from the rotatably driven clutch plate 42, centrally splined on shaft 15, to provide for the hydraulic drive of main body 18 and the attached bladed fan 26 for cooling fan operation. Due to slippage between the clutch plate 42 and the main body 18, the fan speed is always less than the input speed from the shaft 15.

A reservoir 52 formed between the cover plate 30 and the pump plate 38 contains a specified quantity of viscous fluid. The opening and closing of the gates 40 to control the supply of the fluid into the collecting chamber 41 is provided by a valve plate 54 that extends from driving connection with a center shaft 56 rotatably mounted in a tubular hub portion 58 formed in the central portion of the cover plate 30. An O-ring seal 60 is mounted in an annular groove in the center shaft 56 and makes peripheral contact with the inner wall of the hub portion 58 to prevent fluid leakage to the exterior of the assembly 14.

A helically-wound bimetallic the thermostatic valve control element 62 includes an inner end portion 62A mounted in a transverse slot formed in a forward end of the center shaft 56 and an outer end portion 62B mounted in a retaining tab 64 formed in the cover plate 30. Preferably, valve control element 62 is recessed within a cavity 65 surrounding the hub portion 58. Through this construction, an increase or decrease in ambient air temperature causes the winding or unwinding of the valve control element 62, resulting in rotation of the center shaft 56 and the attached valve plate 54. The actuation of valve plate 54 to control the opening and closing of gates 40 is well-known and described in U.S. Pat. No. 4,741,421 and hereby incorporated by reference.

In FIG. 2, fluid indicated by directional arrow 69A, is forced radially outwardly by centrifugal forces and exits the shear zone 48 into a receiving chamber 66 formed and bounded by the pump plate 38, the clutch plate 42 and the divider ring 43. Fluid, indicated by directional arrow 69B, in the receiving chamber 66 is returned to the reservoir 52 through a plurality of orifices 68 provided in a portion of the pump plate 38 in communication with the receiving chamber 66. The return of fluid from the receiving chamber 66 to the reservoir 52 is well-known and described in U.S. Pat. No. 4,741,421 and hereby incorporate d by reference.

In a preferred embodiment as illustrated best in FIGS. 3-8, the clutch plate 42 includes a central hub portion 80 having a central opening 82 for receiving a preferably splined portion of the shaft 15. As described above, a plurality of well-known, concentric annular ridges or lands 49 and accompanying grooves or spaces are provided in the rear face of the disk-like portion 83 of clutch plate 42 adjacent the termination of the hub portion 80.

Preferably, three flow passages or windows 47 are provided in the lands 49 for permitting fluid flow from the collecting chamber 41 into the shear zone 48. The passages 47 are spaced at approximately 120 degrees from each other for balance, and placed at a radial position complementary to the gates 40 of the pump plate 38. To prevent restriction of fluid through gates 40 and passages 47, it is preferred that the area of each passage 47 be at least equal to the area of each gate 40.

At each passage 47, an arcuate, collecting chamber 86 is provided in the lands 49 of the clutch plate 42. Preferably, each chamber 86 is provided by removing the lands 49 on each lateral side of each passage 47. As the clutch plate 42 rotates on shaft 15, fluid enters the passage 47 and collects in chamber 86.

At each passage 47, a radial, fluid expulsion channel 88 is provided. Each expulsion channel 88 originates at a respective passage 47 and terminates at the circumference of the clutch plate 42. Preferably, each channel 88 is provided by removing the lands 49 in a radial direction from the passage 47 to the outer circumference so that the depth of each channel 88 is at least equal to the depth of the grooves between the lands 49.

When the engine is not running and the clutch plate 42 is not rotating, fluid in the shear zone 48 collects in chambers 86 and channels 88. When a cold engine is started, fluid in each channel 88 is expelled radially outwardly by the centrifugal forces of the rotating clutch plate 42. When engine cooling is not required, such as upon the starting of a cold engine, channels 88 provide for the expulsion of a majority of the fluid in the shear zone 48, thereby substantially reducing the rotation of the body 18 and the attached fan 26. Elimination of unwanted high-speed operation of the fan 26 upon starting a cold engine eliminates the unwanted noise accompanying such high-speed operation.

Preferably, three radial dispersion channels 90 are provided in the lands 49 and are equally spaced between channels 88. Each dispersion channel 90 is provided by removing a portion of the lands 49 Dispersion channels 90 assist in the radial dispersion of fluid in the lands 49 and 50 and respective grooves of the shear zone 48.

Preferably, a notch 92 is provided in the circumference of the clutch plate 42 at each expulsion channel 88 and each dispersion channel 90. Notches 92 assist in the pump-out of fluid from the lands 49 and adjacent grooves of the shear zone 48 to the receiving chamber 66, and eventually to the reservoir 52 through orifices (not illustrated) in the pump plate 38 as described above.

Figure 7:
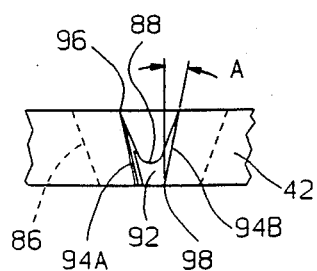
FIG. 7 is a side elevational view as seen along line 7—7 of FIG. 5.
Figure 8:
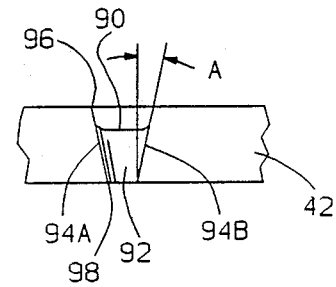
FIG. 8 is a side elevational view as seen along line 8—8 of FIG. 6 wherein the clutch plate has been rotated 180 degrees for purposes of clarity of illustration.

As illustrated in FIGS. 7 and 8, each notch 92 is formed on the circumference of the clutch plate 42 so that at least one angled wall is provided. In the embodiments illustrated in FIGS. 7 and 8, each notch 92 includes two angled walls 94A and 94B so as to form a V-like pattern. This V-like pattern has a mouth 96 on a rear surface of the clutch plate 42 and an exit 98 of the front surface of the clutch plate. The angle of each wall 94A and 94B can be varied to modify the pump-out rate of the notch 92. For example, the greater the angle A as illustrated in FIGS. 7 and 8, the greater the pump-out rate of fluid from the channels 88 and 90. The use of two angled walls 94A and 94B to form a V-like pattern in each notch 92 permits the clutch plate 42 to be incorporated in a clutch assembly designed for clockwise rotation or in a clutch assembly designed for counterclockwise rotation. Depending upon the direction of rotation of clutch plate 42, either angled wall 94A or 94B receives radial flow fluid from a groove 88 or 90 and acts as a pump by changing the fluid to axial flow and forcing the fluid into the receiving chamber 66. The expeditious exit of fluid from the shear zone 48 caused by channels 88 and notches 92 reduces the pump-out time of a clutch assembly 14 for a cold engine, thereby reducing the initial high-speed operation of fan 26 and its accompanying unwanted noise.

Although the present invention has been described with reference to a preferred embodiment, workers skilled in the art will recognize that changes may be made In form and detail without departing from the spirit and scope of the invention.

The embodiments of the invention in which an exclusive property or privilege is claimed are defined as follows:

1. A clutch plate for a viscous fluid clutch assembly, the clutch plate adapted to be rotatably driven by an input shaft comprising:
   (a) a disk-like member having a central hub portion for receiving the input shaft and an annular circumference;
   (b) a plurality of concentric, annular lands and grooves encircling the hub portion;
   (c) a plurality of passages in the lands and grooves for directing fluid in the clutch assembly to the grooves;
   (d) a radial expulsion channel leading from each passage to the circumference of the clutch plate for expelling fluid from the lands and grooves wherein each expulsion channel has a radially innermost end intersecting a respective passage and a radially outermost end intersecting the circumference of the disk-like member.

2. The clutch plate as specified in claim 1 including a notch in the outer circumference of the clutch plate aligned with each expulsion channel.

3. The clutch plate as specified in claim 2 wherein each notch includes at least one angled wall.

4. The clutch plate as specified in claim 1 wherein each expulsion channel has a depth at least equal to the depth of the concentric grooves provided between the lands.

5. The clutch plate as specified in claim 1 including a plurality of radial dispersion channels interspaced between the passages, wherein each dispersion channel terminates at the circumference of the clutch plate for dispersing fluid to the lands and grooves.

6. The clutch plate as specified in claim 5 including a notch in the outer circumference of the clutch plate aligned with each dispersion channel.

7. The clutch plate as specified in claim 6 wherein each notch includes at least one angled wall.

8. The clutch plate as specified in claim 2 including a plurality of radial dispersion channels interspaced between the passages, wherein each dispersion channel terminates at the circumference of the clutch plate for dispersing fluid to the lands and grooves.

9. The clutch plate as specified in claim 8 wherein each expulsion channel has a depth at least equal to the depth of the concentric grooves provided between the lands.

10. The clutch plate as specified in claim 9 including a notch in the outer circumference of the clutch plate aligned with each dispersion channel.

11. The clutch plate as specified in claim 10 wherein each notch includes at least one angled wall.

12. A clutch plate for a viscous fluid clutch assembly, the clutch plate adapted to be rotatably driven by an input shaft comprising:
   (a) a disk-like member having a central hub portion for receiving the input shaft and an annular circumference;
   (b) a plurality of concentric, annular lands and grooves encircling the hub portion;
   (c) a plurality of passages in the lands and grooves for directing fluid in the clutch assembly to the grooves;
   (d) a radial expulsion channel leading from each passage to the circumference of the clutch plate for expelling fluid from the lands and grooves; and
   (e) an arcuate collecting chamber provided at each passage.

13. The clutch plate as specified in claim 12 including a notch in the outer circumference of the clutch plate aligned with each expulsion channel.

14. The clutch plate as specified in claim 13 wherein each notch includes at least one angled wall.

15. The clutch plate as specified in claim 12 wherein each expulsion channel has a depth at least equal to the depth of the concentric grooves provided between the lands.

16. The clutch plate as specified in claim 12 including a plurality of radial dispersion channels interspaced between the passages, wherein each dispersion channel terminates at the circumference of the clutch plate for dispersing fluid to the lands and grooves.

17. The clutch plate as specified in claim 16 including a notch in the outer circumference of the clutch plate aligned with each dispersion channel.

18. The clutch plate as specified in claim 17 wherein each notch includes at least one angled wall.

* * * * *